UNITED STATES PATENT OFFICE.

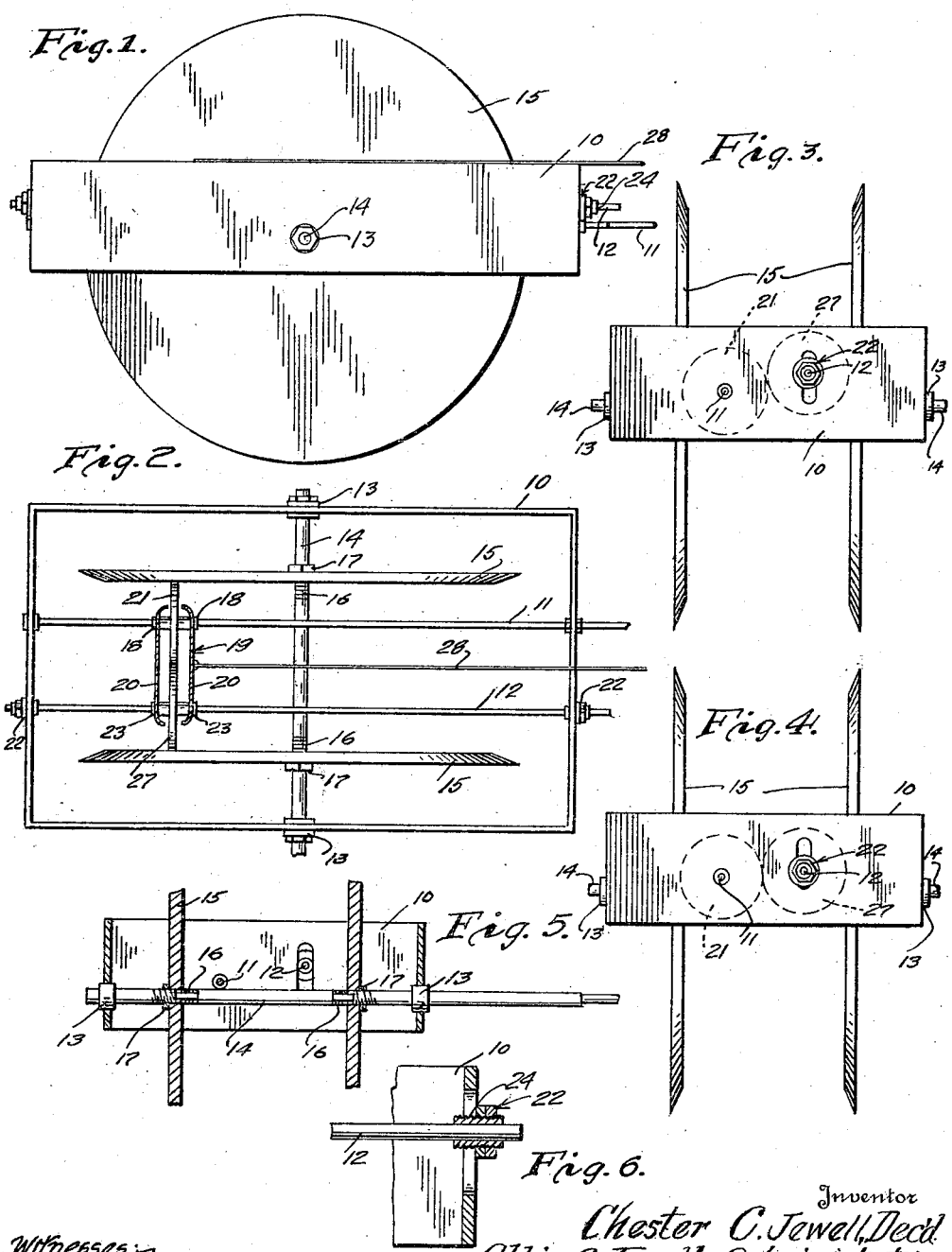

CHESTER C. JEWELL, DECEASED, LATE OF SPOONER, WISCONSIN, BY ABBIE A. JEWELL, ADMINISTRATRIX, OF SPOONER, WISCONSIN, ASSIGNOR OF ONE-HALF TO JAMES W. WILSON, OF SPOONER, WISCONSIN.

FRICTION TRANSMISSION.

1,279,117.  Specification of Letters Patent.  Patented Sept. 17, 1918.

Application filed September 26, 1917. Serial No. 193,350.

*To all whom it may concern:*

Be it known that CHESTER C. JEWELL, deceased, late a citizen of the United States, and late resident of Spooner, in the county of Washburn and State of Wisconsin, has invented certain new and useful Improvements in Friction Transmission; and I, ABBIE A. JEWELL, administratrix of the estate of the said CHESTER C. JEWELL, do hereby declare the following to be a full, clear, and exact description of the invention, as understood by me, and such as will enable others skilled in the art to which it appertains to make and use the same.

This invention is an improvement in power transmission and has particular reference to a friction disk transmission employed to propel vehicles and other machinery.

An object of the invention is to compensate for the wear on the several disks of the transmission and, to this end, use is made of a pair of shafts each carrying a friction disk adapted for engagement with the disk on the other shaft, one of said shafts being adjustable relative to the other so that as the engaging surfaces of the disks wear the same may at all times be maintained in frictional engagement. In further carrying out this object, the driven shaft is mounted for endwise movement so that when the relatively adjustable shaft is shifted, the driven shaft will also be adjusted endwise to maintain the disks thereof in engagement with the disks on said drive shaft.

Another object is the provision of a transmission of this character which is simple in construction, easy to manufacture and effective in carrying out the purpose for which it is designed.

The inventive idea involved is capable of receiving a variety of mechanical expressions, one of which, for the purpose of illustrating the invention, is shown in the accompanying drawing, wherein:—

Figure 1 is a side elevation of the transmission constructed in accordance with the invention.

Fig. 2 is a top plan view.

Fig. 3 is an end elevation.

Fig. 4 is an end elevation showing the relative positions of the disks after being worn.

Fig. 5 is a section taken longitudinally of the driven shaft.

Fig. 6 is a detail view of one of the bearings of the adjustable drive shaft.

Referring more particularly to the accompanying drawing the numeral 10 indicates the transmission which has journaled therein the main drive shaft 11 connected to a source of power and having adjustable relative thereto, in a manner to appear in the course of the description, the counter shaft 12 parallel to said shaft 11. Mounted transversely of the frame 10 in the bearings 13 is the driven shaft 14 carrying the large longitudinally adjustable friction disks 15. This driven shaft 14 has the disks 15 secured thereon by means of washers 16 and nuts 17. Either of the disks 15 is adjustable by removing one or more of the washers 16 from the inner side thereof, and then moving the disk inwardly, after which the washer or washers removed are interposed between the outer face of the disk and the nut 17, whereupon the latter is tightened.

The main drive shaft 11 extends through the bearings 18 carried by one end of a housing 19 including the oppositely disposed plates 20 and mounted between said plates and movable with the frame is the small friction disk 21 the periphery of which engages the adjacent disk 15. The counter shaft 12 is mounted in the bearings 22 at the ends of the frame and similar bearings 23 carried by the frame 19 at the opposite ends of the plate from the bearings 18. Normally, this shaft 12 is in a horizontal plane above that of the shaft 11 and the bearings 22 and 23 are adjustable to raise and lower the shaft 12 to compensate for the wear on the disks 15, 21 and 27, the latter disk being in engagement with the disk 21 and also being adjacent the disk 15. In order to obtain the various speeds, the frame 19 has connected thereto the rod 28 secured to a shifting lever, (not shown) and operable to slide the disks 21 and 27 longitudinally of their shafts.

It will be apparent from the foregoing description, that as the peripheries of the disks 21 and 27 are worn it will be necessary to lower the disk 27 in order that the same will contact the disk 21 and this adjustment of the disks 27 is performed by lowering the shaft 12 in the bearing blocks 24. This adjustment of the disk 27 will cause the same to engage the adjacent disk 15 and this engagement will adjust the driven shaft 14 end-wise so that the other disk 15 will engage the peripheery of the disk 21. If desired, the disks 15 may also be adjusted longitudinally of the shaft 14 in order to cause a proper engagement between the different parts. It is also to be noted that by providing four friction disks a saving of power is accomplished which would otherwise be lost in the friction transmission most commonly employed.

What is claimed is:—

1. In a power transmission mechanism, the combination of parallel drive shafts, a driven shaft arranged transversely thereto, disks carried by said drive shafts and in engagement with each other, other disks carried by the driven shaft and in engagement with the first named disks, and means for vertically adjusting one of said drive shafts and the disk carried thereby.

2. In a power transmission mechanism, the combination of parallel drive shafts, a driven shaft arranged transversely thereto, disks carried by said drive shafts and in engagement with each other, other disks carried by the driven shaft and in engagement with the first named disks, a frame extending between said drive shafts and adjustable longitudinally thereof to shift the disks thereon, yieldable bearings carried by said frame for receiving one of said drive shafts, and means for adjusting said bearings to vertically adjust the shaft mounted therein.

3. In a power transmission mechanism, the combination of parallel drive shafts arranged in different horizontal planes, one of said shafts being adjustable vertically relative to the other, friction disks carried by said shafts for engagement with each other, a driven shaft having end-wise movement mounted transversely of said drive shafts and disks carried by said driven shaft for engagement with the disks on said drive shafts.

In testimony whereof I, the said adminstratrix, do affix my signature in the presence of two witnesses.

ABBIE A. JEWELL,
Administratrix of Chester C. Jewell, deceased.

Witnesses:
Mrs. E. C. JEWELL,
E. C. JEWELL.